United States Patent
Yang (10) Patent No.: US 10,082,903 B2
(45) Date of Patent: Sep. 25, 2018

(54) DISPLAY PANEL AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventor: Wenbin Yang, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 185 days.

(21) Appl. No.: 15/373,846

(22) Filed: Dec. 9, 2016

(65) Prior Publication Data

US 2017/0090662 A1     Mar. 30, 2017

(30) Foreign Application Priority Data

Jul. 29, 2016    (CN) .......................... 2016 1 0617177

(51) Int. Cl.
| | |
|---|---|
| *G06F 3/041* | (2006.01) |
| *G06F 3/044* | (2006.01) |
| *G06F 3/045* | (2006.01) |
| *G02F 1/1333* | (2006.01) |

(52) U.S. Cl.
CPC ............ *G06F 3/0416* (2013.01); *G06F 3/044* (2013.01); *G06F 3/045* (2013.01); *G06F 3/0412* (2013.01); *G02F 1/13338* (2013.01); *G06F 2203/04111* (2013.01)

(58) Field of Classification Search
CPC ...... G06F 3/0416; G06F 3/045; G06F 3/0412; G06F 3/044; G06F 2203/04111; G02F 1/13338
See application file for complete search history.

(56) References Cited

U.S. PATENT DOCUMENTS

| | | | |
|---|---|---|---|
| 2016/0202815 A1* | 7/2016 | Zheng ..................... | G06F 3/044 345/174 |
| 2017/0060317 A1* | 3/2017 | Kim ....................... | G06F 3/0416 |
| 2017/0090627 A1* | 3/2017 | Kim ........................ | G06F 3/047 |

* cited by examiner

*Primary Examiner* — Jonathan Boyd
(74) *Attorney, Agent, or Firm* — Anova Law Group, PLLC (57) ABSTRACT

A display panel and a display device are provided. The display panel comprises an array substrate including a plurality of pixel sequences arranged in a first direction, a plurality of first touch control electrodes arranged in the first direction, and a plurality of first touch control electrode signal lines. A pixel sequence includes a plurality of pixels arranged in a second direction intersecting the first direction. A pixel includes N number of sub-pixels continuously arranged in the first direction, N being a positive integer equal to or greater than 3. An orthogonal projection of a first touch control electrode onto the array substrate covers an orthogonal projection of M number of pixel sequences onto the array substrate, M being a positive integer. L number of first touch control electrode signal lines are electrically connected to a same first touch control electrode, and L satisfies L≤M×(N−2).

20 Claims, 11 Drawing Sheets

DISPLAY PANEL AND DISPLAY DEVICE

CROSS-REFERENCES TO RELATED APPLICATIONS

This application claims priority of Chinese Patent Application No. 201610617177.5, filed on Jul. 29, 2016, the entire contents of which are hereby incorporated by reference.

BACKGROUND

Currently, for a capacitive touch control liquid crystal display (LCD) panel, a common electrode is often divided into a plurality of stripe-shaped common sub-electrodes, which are mutually insulated from each other. Through a time-division multiplexing driving method, the stripe-shaped common sub-electrodes are multiplexed as touch control electrodes. The extending direction of the stripe-shaped common sub-electrodes is often parallel to the extending direction of the data lines.

Compared with a planar common electrode which covers all the sub-pixels in the display region, each stripe-shaped common sub-electrode, which is obtained from dividing the common electrode, has a substantially small area. Thus, the on-resistance of the stripe-shaped common sub-electrode is significantly increased. To reduce the resistance of the common sub-electrodes and improve the touch control sensitivity, two ends of each stripe-shaped common sub-electrode are respectively provided with a plurality of touch control electrode signal lines, which transmit a touch control driving signal to the stripe-shaped common sub-electrode. Such an arrangement of the touch control electrode signal lines reduces the resistance of the common sub-electrodes.

However, because the touch control electrode signal lines are often arranged parallel to display signal lines, when the touch control signal line or the display signal line is transmitting an electrical signal, a coupling capacitance may be formed between the touch control signal line and the display signal line. When a total coupling capacitance is substantially large, in a display stage, the display contrast and color saturation of the image may be affected, degrading the image performance; while in a touch control stage, a touch detection signal may become substantially weak, degrading the touch control sensitivity of the display panel.

The disclosed display panel and display device thereof are directed to solve one or more problems set forth above and other problems.

BRIEF SUMMARY OF THE DISCLOSURE

One aspect of the present disclosure provides a display panel. The display panel comprises an array substrate including a plurality of pixel sequences arranged in a first direction, a plurality of first touch control electrodes arranged in the first direction, and a plurality of first touch control electrode signal lines. A pixel sequence includes a plurality of pixels arranged in a second direction intersecting the first direction. A pixel includes N number of sub-pixels continuously arranged in the first direction, N being a positive integer equal to or greater than 3. An orthogonal projection of a first touch control electrode onto the array substrate covers an orthogonal projection of M number of pixel sequences onto the array substrate, M being a positive integer. A first touch control electrode signal line is electrically connected to a first touch control electrode to provide a signal to the first touch control electrode. L number of first touch control electrode signal lines are electrically connected to a same first touch control electrode, and L satisfies $L \leq M \times (N-2)$.

Another aspect of the present disclosure provides a display device including a display panel. The display panel comprises an array substrate including a plurality of pixel sequences arranged in a first direction, a plurality of first touch control electrodes arranged in the first direction, and a plurality of first touch control electrode signal lines. A pixel sequence includes a plurality of pixels arranged in a second direction intersecting the first direction. A pixel includes N number of sub-pixels continuously arranged in the first direction, N being a positive integer equal to or greater than 3. An orthogonal projection of a first touch control electrode onto the array substrate covers an orthogonal projection of M number of pixel sequences onto the array substrate, M being a positive integer. A first touch control electrode signal line is electrically connected to a first touch control electrode to provide a signal to the first touch control electrode. L number of first touch control electrode signal lines are electrically connected to a same first touch control electrode, and L satisfies $L \leq M \times (N-2)$.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

Figure 1:
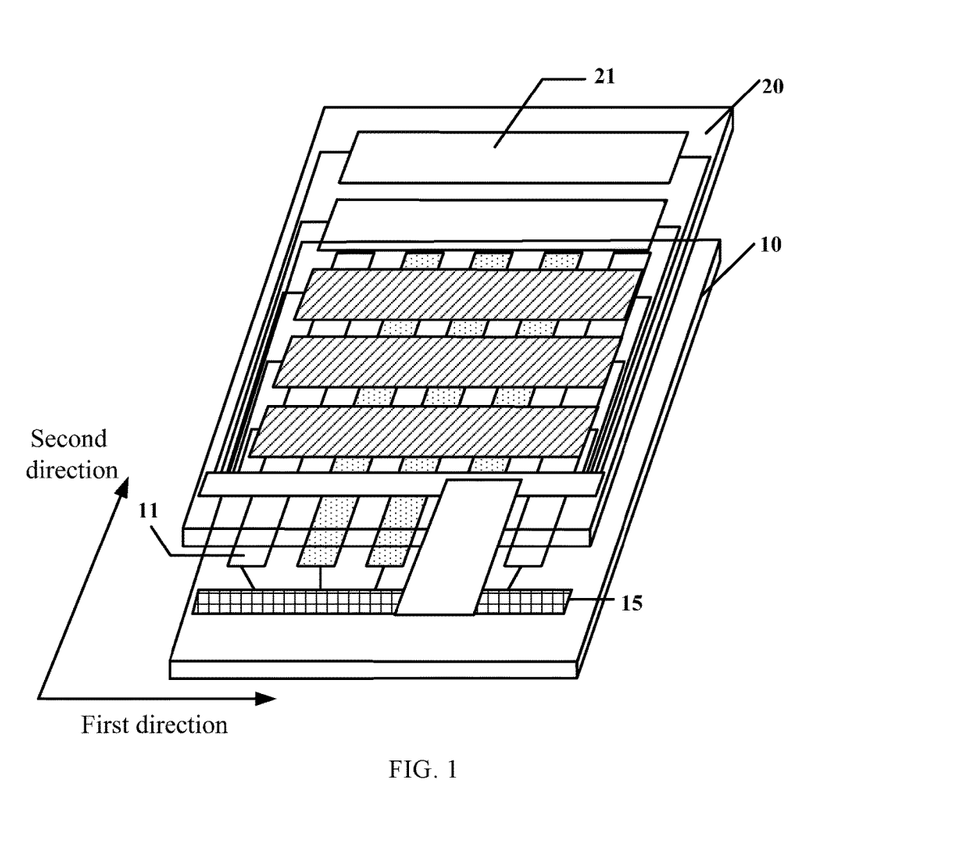
FIG. 1 illustrates an exemplary display panel consistent with disclosed embodiments.

FIG. 1 illustrates an exemplary display panel consistent with disclosed embodiments. The disclosed display panel may be a liquid crystal display (LCD) panel, an organic light-emitting diode (OLED) display panel, a plasma display panel (PDP), a field emission display (FED) panel, a light-emitting diode (LED) display panel, a quantum dots (QDs) display panel, an electrophoretic display panel or other appropriate display panel capable of displaying videos and/ or images.

In one embodiment, as shown in FIG. 1, the display panel may be an LCD panel, which may include an array substrate 10 and a color film substrate 20. The array substrate 10 may be disposed opposite to the color film substrate 20. Any appropriate components may also be included, such as a liquid crystal layer sandwiched between the array substrate 10 and the color film substrate 20, and spacers for maintaining a cell gap, which are not further explained here.

The array substrate 10 may include a plurality of first touch control electrodes 11. A plurality of second touch control electrodes 21 may be disposed on one surface of the color film substrate 20 far away from the array substrate 10, for example, an upper surface of the color film substrate 20 in FIG. 1. That is, the display panel may be a hybrid-in-cell touch control display panel. In particular, the first touch control electrodes 11 may be extending in a second direction and arranged in a first direction, and the second touch control electrodes 21 may be extending in the first direction and arranged in the second direction. The first direction may intersect the second direction. An orthogonal projection of a second touch control electrode 21 onto the array substrate 10 may be at least partially overlapped with each first touch control electrode 11.

The first touch control electrode 11 and the second touch control electrode 21 may have different shapes according to various application scenarios. In one embodiment, as shown in FIG. 1, the first touch control electrode 11 and the second touch control electrode 21 may be a stripe-shaped electrode, respectively. That is, the stripe-shaped first touch control electrodes 11 may be extending in the second direction and arranged in the first direction. Meanwhile, the stripe-shaped second touch control electrodes 21 may be extending in the first direction and arranged in the second direction.

In another embedment, the first touch control electrode 11 and the second touch control electrode 21 may be different from the stripe-shaped electrodes. For example, the first touch control electrode 11 and/or the second touch control electrode 21 may be zip-zag electrodes, respectively. The numbers and the shape of the touch control electrodes in FIG. 1 are for illustrative purposes, and are not intended to limit the scope of the present disclosure.

Figure 2:
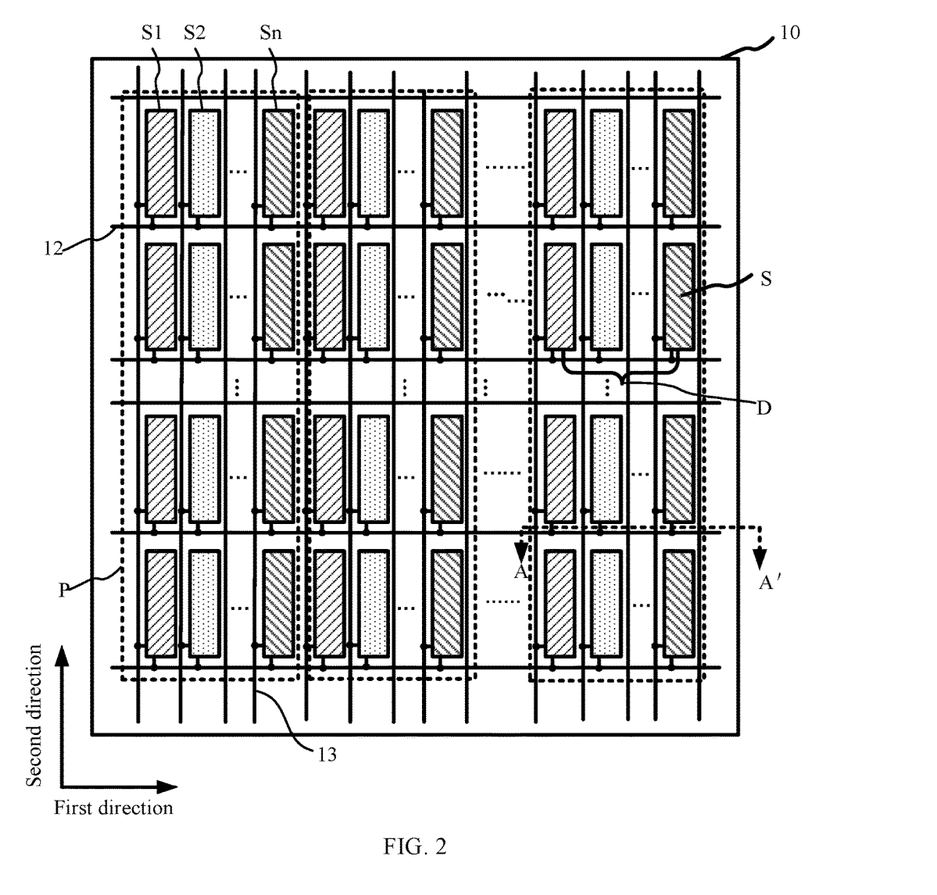
FIG. 2 illustrates exemplary scanning lines, exemplary data lines, and exemplary sub-pixels in an exemplary array substrate consistent with disclosed embodiments.
Figure 3A:
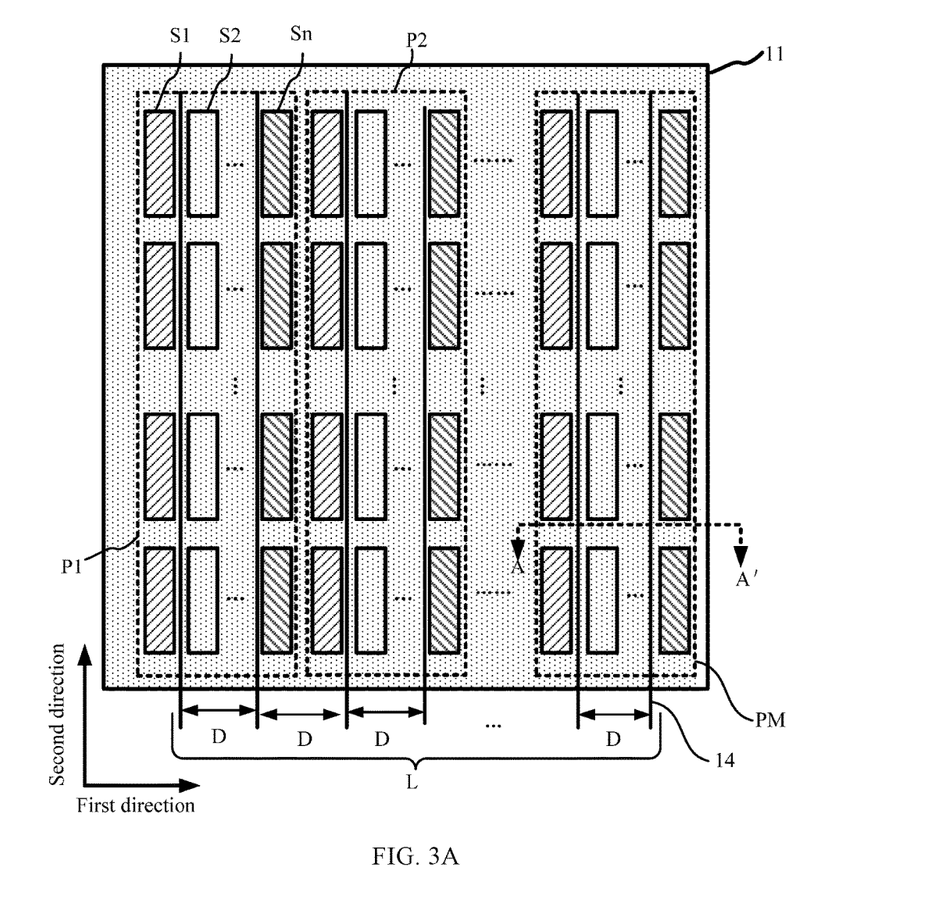
FIG. 3A illustrates an exemplary arrangement of a first touch control electrode, pixel sequences, and first touch control electrode signal lines in an exemplary array substrate consistent with disclosed embodiments.

FIG. 2 illustrates exemplary scanning lines, exemplary data lines, and exemplary sub-pixels in an exemplary array substrate consistent with disclosed embodiments. FIG. 3A illustrates an exemplary arrangement of a first touch control electrode, pixel sequences, and first touch control electrode signal lines in an exemplary array substrate consistent with disclosed embodiments.

As shown in FIG. 2, the array substrate 10 may include a plurality of scanning lines 12, a plurality of data lines 13 intersecting the scanning lines 12, and a plurality of sub-pixels S confined by the intersected scanning lines 12 and data lines 13. In particular, the scanning line 12 may extend in the first direction, and the data lines 13 may extend in the second direction. That is, an extending direction of the scanning line 12 may be parallel to the first direction, and an extending direction of the data line 13 may be parallel to the second direction.

The plurality of sub-pixels S may be arranged in an array, in which N number of sub-pixels S1, S2 . . . SN−1, SN continuously arranged in the first direction may form a pixel D, where N is a positive integer equal to or greater than 3. The pixel D, for example, may be a display unit. A plurality of pixels D may be continuously disposed in the second direction to form a pixel sequence P. That is, the array substrate 10 may include a plurality of pixel sequences P arranged in the first direction, in which the first direction may intersect the second direction.

In particular, when the stripe-shaped first touch control electrode 11 disposed on the array substrates 10 are arranged in the first direction, an orthogonal projection of each stripe-shaped first touch control electrode 11 onto the array substrate 10 may cover an orthogonal projection of M number of pixel sequences P1, P2 . . . PM onto the array substrate 10, where M is a positive integer.

During a touch control stage, the first touch control electrode 11, for example, may transmit a touch control driving signal. Because the first touch control electrode 11 is often made of transparent metal oxides, such as indium tin oxide (ITO), the first touch control electrode 11 has a substantially large resistivity. Thus, when being transmitted in the first touch control electrode 11, the touch control driving signal may experience a substantially large voltage drop, and the touch control sensitivity of the display panel may be degraded. To improve the touch control sensitivity, as shown in FIG. 3A, the array substrate 10 may be disposed with a plurality of first touch control electrode signal lines 14 electrically connected to the first touch control electrode 11.

Figure 4:
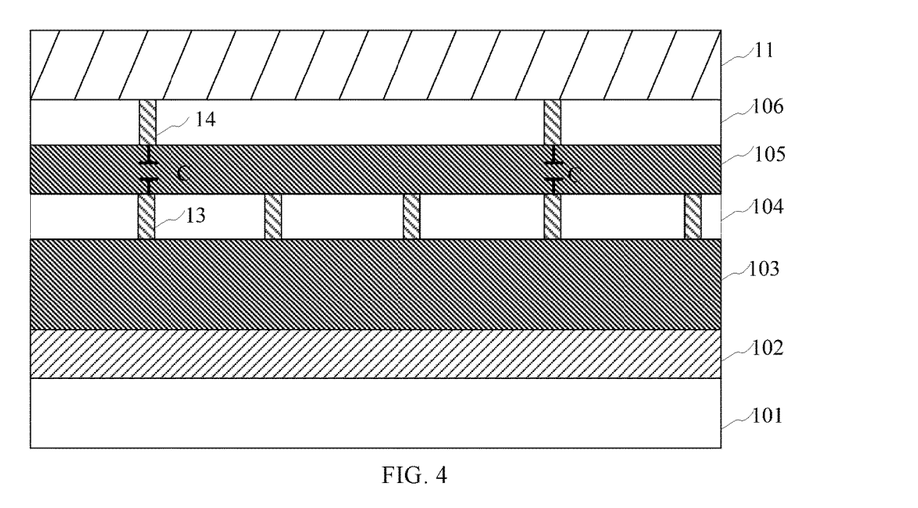
FIG. 4 illustrates an AA' sectional view of an exemplary array substrate in FIG. 3A consistent with disclosed embodiments.

FIG. 4 illustrates an AA' sectional view of an exemplary array substrate in FIG. 3A consistent with disclosed embodiments. As shown in FIG. 4, the array substrate 10 may include a base substrate 101, a first metal layer 102 disposed on the base substrate 101, a second metal layer 104, a third metal layer 106, a first insulating layer 103, and a second insulating layer 105. The first insulating layer 103 may be disposed between the first metal layer 102 and the second metal layer104, and the second insulating layer 105 may be disposed between the second metal layer104 and the third metal layer 106.

In particular, the first metal layer 102 may be disposed on one side of the base substrate 101, for example, an upper surface of the base substrate 101 in FIG. 4. The second metal layer 104 may be disposed on one side of the first metal layer 102 far away from the base substrate 101, and the third metal layer 106 may be disposed on one side of the second metal layer 104 far away from the first metal layer 102.

A plurality of scanning lines (not shown in FIG. 4) may be disposed in the first metal layer 102, a plurality of data lines 13 may be disposed in the second metal layer 104, and a plurality of first touch control electrode signal lines 14 may be disposed in the third metal layer 106. A plurality of first touch control electrodes 11 may be disposed on one side of the third metal layer 106 far away from the second insulating layer 105.

Further, as shown in FIG. 4, the first touch control electrodes 11 may be directly in contact with the first touch control electrode signal lines 14, and the first touch control electrode signal lines 14 may be disposed between the first touch control electrodes 11 and the second insulating layer 105. In certain embodiments, the first touch control electrode signal lines 14 may be disposed on one side of the first touch control electrodes 11 away from the second insulating layer 105, and the first touch control electrode signal lines 14 may be directly in contact with the first touch control electrodes 11. That is, the first touch control electrodes 11 may be disposed between the first touch control electrode signal lines 14 and the second insulating layer 105. The disclosed arrangement of the first touch control electrodes 11 and the first touch control electrode signal lines 14 may be able to reduce the voltage drop of the touch control driving signal when being transmitted along the first touch control electrode 11, and improve the touch control sensitivity of the display panel.

In certain other embodiments, an insulating layer may be disposed between the first touch control electrodes 11 and the first touch control electrode signal lines 14. That is, the first touch control electrode 11 and the first touch control electrode signal line 14 may be no longer directly in contact with each other. Instead, a plurality of through-holes may be disposed in the insulating layer, and the two ends of the first touch control electrode 11 may be electrically connected to the first touch control electrode signal line 14 via the through-holes, receptively.

Because both the first touch electrode signal line 14 and the data line 13 may extend in the second direction and, meanwhile, the first touch electrode signal line 14 may be arranged parallel to the data line 13, when an electrical signal is transmitted in the first touch electrode signal line 14 or the data line 13, a coupling capacitance C may be formed between the first touch electrode signal line 14 and the data line 13.

In the display stage, the data line 13 may charge the pixel electrode in each sub-pixel to drive the liquid crystals, through which the liquid crystals may be rotated by an appropriate angle to display images. The degree of a rotational angle of the liquid crystals may affect the image contrast and color saturation. On the other hand, the degree of the rotational angle of the liquid crystals may be controlled by the voltage on the pixel electrode after the pixel electrode is charged by the data line. Because of the coupling capacitance C, when the data line 13 is charging the pixel electrode, the charging voltage provided by the data line 13 may be divided by the coupling capacitance C and, thus, the voltage applied to the pixel electrode may be reduced.

When the coupling capacitance is substantially small, the effect on the display performance caused by dividing the charging voltage may be negligible. However, when the coupling capacitance is substantially large, the charging voltage applied onto the pixel electrode may be insufficient, which may degrade the image contrast and color saturation.

In addition, during the touch control stage, the coupling capacitor may deplete the induced charge, and degrade the touch control sensitivity. Thus, to get a desired image performance of the touch control display panel and a desired touch control sensitivity, the number of the first touch control electrode signal lines 14 may have to be controlled.

In one embodiment, for example, the number L of the first touch control electrode signal lines 14 electrically connected to the same first touch control electrode 11 may satisfy the following condition: $L \leq M \times (N-2)$. That is, the number L of the first touch control electrode signal lines 14 electrically connected to the same first touch control electrode 11 may be smaller than or equal to $M \times (N-2)$. Through limiting the number of the first touch control electrode signal lines 14 to $L \leq M \times (N-2)$, the resistance of the first touch control electrode 11 may be reduced and, meanwhile, the sum of a plurality of coupling capacitances formed between each first touch control electrode signal line 14 and each first touch control electrode 11 may be limited within a desired range. That is, a total coupling capacitance formed between each first touch control electrode signal line 14 and each first touch control electrode 11 may be limited within a desired range. Thus, a desired image performance of the display panel and a desired touch control sensitivity may be achieved at the same time.

In addition, when the number of the first touch control electrode signal lines 14 electrically connected to the same first touch control electrode 11 is reduced, the transmission speed of the touch control driving signal in the first touch control electrode 11 may be reduced, and the distribution uniformity of the touch control driving signal in the first touch control electrode 11 may also be reduced. Thus, in practical applications, the number of the first touch control electrode signal lines 14 electrically connected to the same first touch control electrode 11 may have to be determined according to both the coupling capacitance formed between the first touch control electrode signal lines 14 and the data lines 13, as well as the resistance of the first touch control electrode 11.

Figure 5:
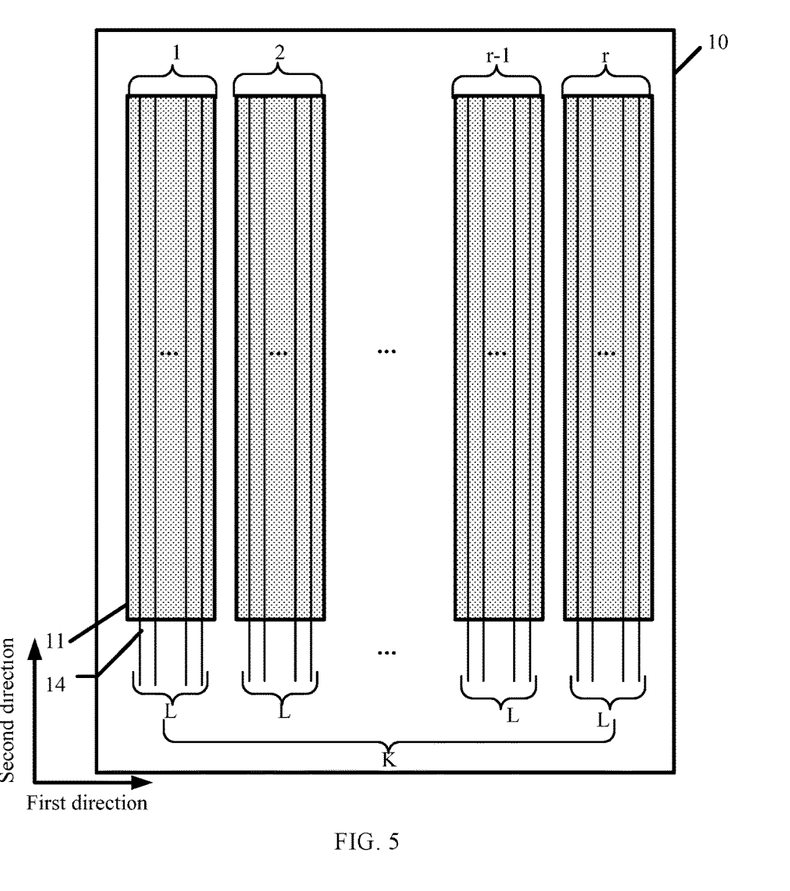
FIG. 5 illustrates an exemplary arrangement of first touch control electrodes and first touch control electrode signal lines in FIG. 3A in an exemplary array substrate consistent with disclosed embodiments.

FIG. 5 illustrates an exemplary arrangement of first touch control electrodes and first touch control electrode signal lines in FIG. 3A in an exemplary array substrate consistent with disclosed embodiments. As shown in FIG. 5, the array substrate may include r number of first touch control electrodes 11 extending in the second direction and arranged in the first direction. Each first touch control electrode 11 may correspond to L number of first touch electrode signal lines 14. It should be noted that, the number L of the first touch electrode signal lines 14 connected to each first touch control electrode 11 may be the same or may be different. The array substrate 10 may include total K number of first touch control electrode signal lines 14.

For example, a 1920×1080 display panel includes 1080 columns of pixels. Each pixel may include N number of sub-pixels in the extending direction of the scanning lines, for example, N may be equal to 3. Further, the display panel may include, for example, 35 first touch control electrodes 11 extending in the second direction and arranged in the first direction. Each first touch control electrode 11 may be electrically connected with a same number of first touch electrode signal lines 14. To reduce the resistance of the first touch control electrodes 11, in the pixel sequence, (N−2) number of first touch electrode signal lines 14 may be electrically connected to each first touch electrode signal line 14.

To control the coupling capacitance within a desired range, one first touch electrode signal line 14 may be disposed between two adjacent pixel sequences. Thus, the number of the first touch electrode signal lines 14 electrically connected to any of the first touch control electrodes 11 may satisfy: $15 \times (N-2) \leq L \leq 35 \times (N-2)$. In certain embodiments, when N is equal to 3, each column of pixels (i.e., each pixel column) may be provided with one first touch electrode signal line 14. That is, in the array substrate 10 of the 1920×1080 three primary colors (red, green, blue) display panel, the number K of the first touch electrode signal lines may be $540 \leq K \leq 1200$.

In one embodiment, as shown in FIG. 3A, the K number of first touch electrode signal lines 14 may be disposed on the array substrate 10 with an equal interval. That is, the distance between any two adjacent first touch electrode signal lines 14 disposed on the array substrate 10 may be equal, for example, the distance between any two adjacent first touch electrode signal lines 14 may be d, such that the complexity of the forming the first touch electrode signal lines 14 on the third metal layer 106 may be reduced.

Figure 3B:
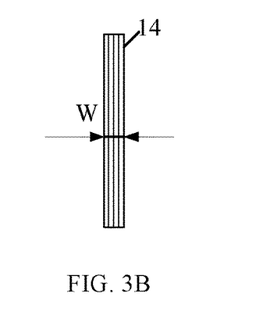
FIG. 3B illustrates a top view of an exemplary first touch control electrode signal line in FIG. 3A consistent with disclosed embodiments.

In certain embodiments, each first touch electrode signal line 14 may be configured to have a substantially narrow width, such that the coupling capacitance formed between the first touch electrode signal line and the data line may be reduced. The corresponding structure is shown in FIG. 3B. FIG. 3B illustrates a top view of an exemplary first touch control electrode signal line in FIG. 3A consistent with disclosed embodiments. In one embodiment, as shown in FIG. 3B, the width W of the first touch electrode signal line 14 may be approximately 2 μm-4 μm.

Figure 6:
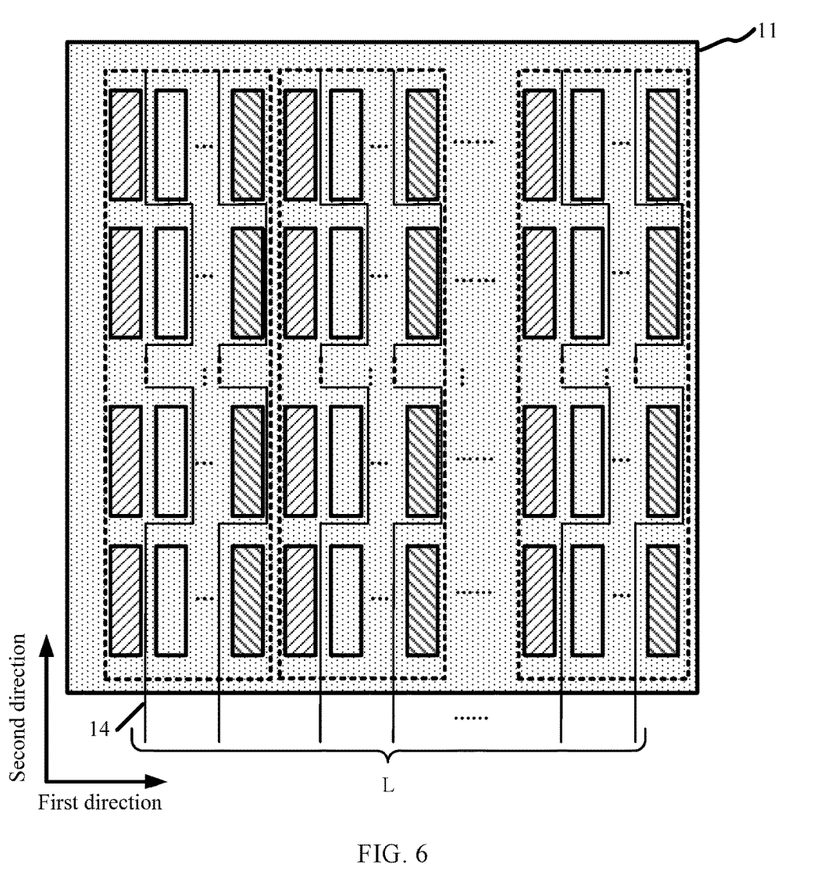
FIG. 6 illustrates another exemplary arrangement of a first touch control electrode, pixel sequences, and first touch control electrode signal lines in an exemplary array substrate consistent with disclosed embodiments.

FIG. 6 illustrates another exemplary arrangement of a first touch control electrode, pixel sequences, and first touch control electrode signal lines in an exemplary array substrate consistent with disclosed embodiments. The similarities between FIG. 6 and FIG. 3A are not repeated here, while certain differences may be explained.

As shown in FIG. 6, the first touch electrode signal line 14 may be configured to be a fold line. The first touch control electrode 11 may correspond to L number of touch electrode signal lines 14, each of which is fold line. Thus, the contact area between the first touch electrode signal line 14 and the first touch control electrode 11 may be increased, which may facilitate the transmission of the touch control driving signal to the first touch control electrode 11. That is, when the first touch electrode signal line 14 is a fold line, the first touch electrode signal line 14 may include a plurality of line segments which do not belong to the same straight line. The plurality of line segments may have to be disposed beyond the light transmission area of the pixels.

Figure 7:
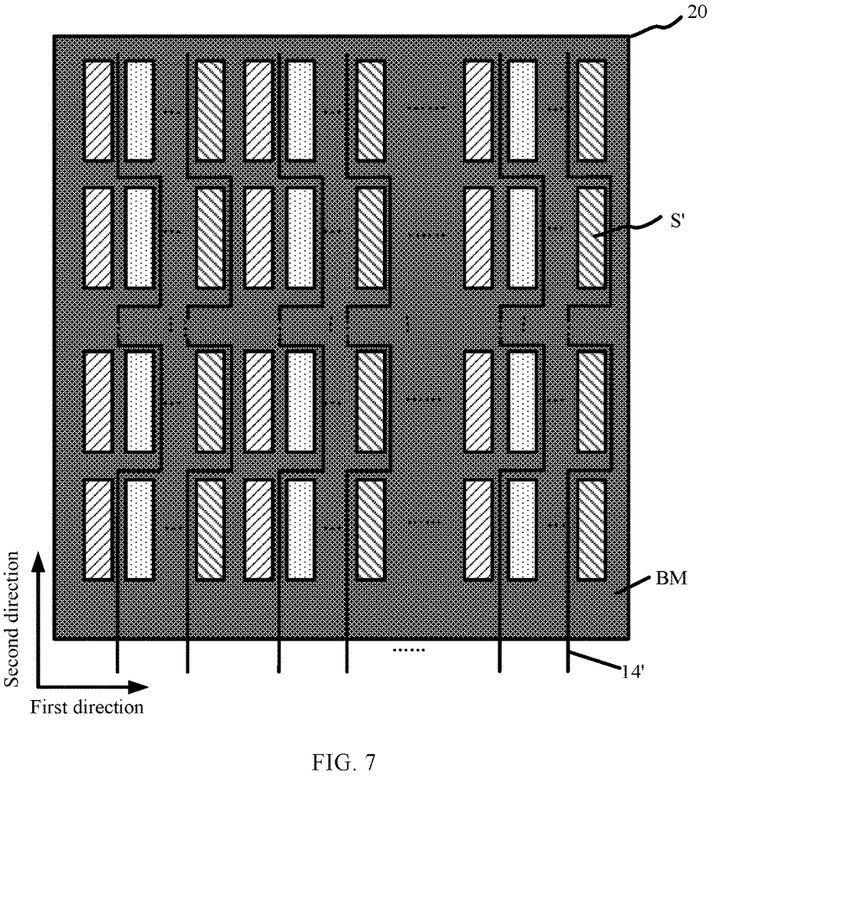
FIG. 7 illustrates one surface of an exemplary color film substrate far away from an exemplary array substrate in FIG. 6 consistent with disclosed embodiments.

FIG. 7 illustrates one surface of an exemplary color film substrate far away from an exemplary array substrate in FIG. 6 consistent with disclosed embodiments. As shown in FIG. 7, one surface of the color film substrate 20 far away from the array substrate 10 in FIG. 6 may be disposed with a plurality of color filter units S'. Referring to FIG. 6 and FIG. 7, each color filter unit S' in FIG. 7 may correspond to one sub-pixel in the array substrate 10 in FIG. 6. The color film substrate 20 may also include a black matrix (BM), which may separate the color filter units S' from each other.

Further, as shown in FIG. 7, the first touch electrode signal line 14 may be a fold line, and an orthogonal projection of the first touch electrode signal line 14 onto the color film substrate 20 may fall within the black matrix (BM). That is, the black matrix (BM) may cover the orthogonal projection of the first touch electrode signal line 14 onto the color film substrate 20. Thus, the light transmittance of the touch control display panel may not be affected by the first touch electrode signal lines 14 and, accordingly, the image brightness may not be degraded.

Figure 8:
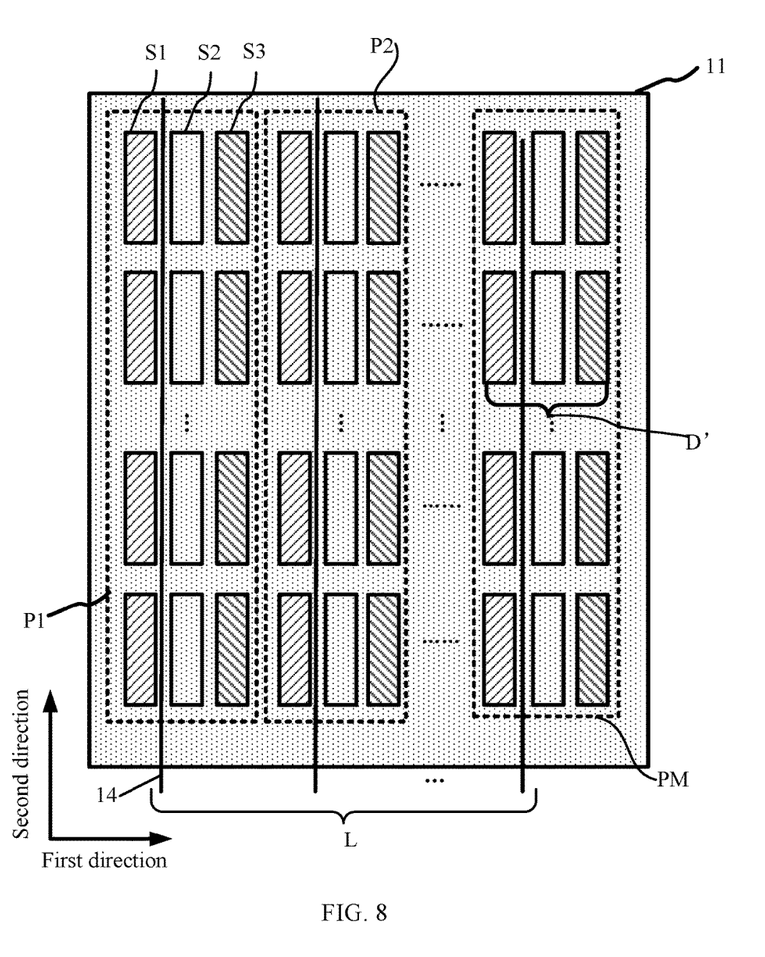
FIG. 8 illustrates another exemplary arrangement of a first touch control electrode, pixel sequences, and first touch control electrode signal lines in an exemplary array substrate consistent with disclosed embodiments.

FIG. 8 illustrates another exemplary arrangement of a first touch control electrode, pixel sequences, and first touch control electrode signal lines in an exemplary array substrate consistent with disclosed embodiments. The similarities between FIG. 8 and FIG. 3A are not repeated here, while certain differences may be explained.

As shown in FIG. 8, the first touch control electrode 11 may cover M number of pixel sequences P1, P2 . . . PM arranged in the first direction, and each pixel sequence may include a plurality of pixels D' arranged in the second direction. Each pixel D' may include three sub-pixels continuously arranged in the first direction. Referring to FIG. 1 and FIG. 8, when the array substrate 10 in FIG. 1 includes a plurality of first touch control electrodes and a plurality of pixel sequences shown in FIG. 8, the color filter units corresponding to the three sub-pixels in the same pixel D' may have different colors. In one embodiment, the color filter units corresponding to the three sub-pixels S1, S2 and S3 in the same pixel D' may respectively have any color of red, green, and blue.

In certain embodiments, the number L of the first touch electrode signal line 14 electrically connected to the first touch control electrode 11 may be configured to be smaller than or equal to M. The first touch electrode signal line 14 may be disposed between two adjacent sub-pixel columns in the same pixel sequence. Thus, the resistance of the first touch control electrode 11 in the three primary color display panel may be reduced and, meanwhile, the total coupling capacitance formed between each first touch electrode signal line 14 and each data line 13 may be controlled within a desired range. Accordingly, the image performance and the touch control sensitivity of the three primary color display panel having the array substrate in FIG. 8 may be improved.

Figure 9:
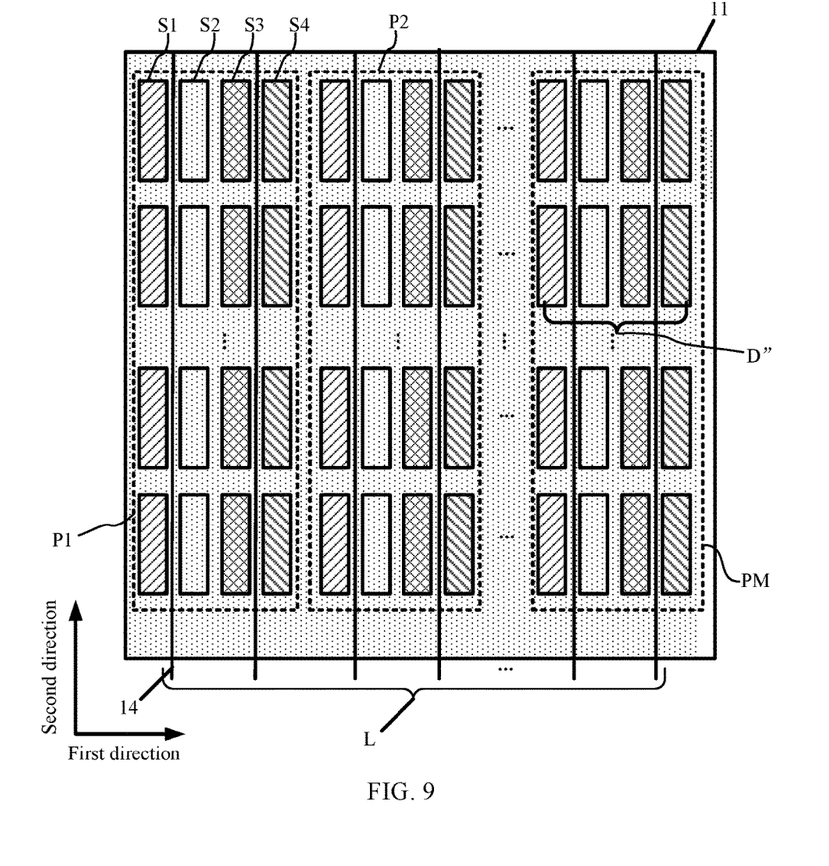
FIG. 9 illustrates another exemplary arrangement of a first touch control electrode, pixel sequences, and first touch control electrode signal lines in an exemplary array substrate consistent with disclosed embodiments.

FIG. 9 illustrates another exemplary arrangement of a first touch control electrode, pixel sequences, and first touch control electrode signal lines in an exemplary array substrate consistent with disclosed embodiments. The similarities between FIG. 8 and FIG. 9 are not repeated here, while certain differences may be explained.

As shown in FIG. 9, different from the pixel D' in FIG. 8, each pixel D" in FIG. 9 may include four sub-pixels continuously arranged in the first direction. Referring to FIG. 1 and FIG. 9, when the array substrate 10 in FIG. 1 includes a plurality of first touch control electrodes and a plurality of pixel sequences shown in FIG. 9, on the color film substrate 20, the color filter units corresponding to the four sub-pixels in the same pixel D" may have different colors. In one embodiment, on the color film substrate 20, the color filter units corresponding to the three sub-pixels S1, S2, S3, and S4 in the same pixel D' may respectively have any color of red, green, blue, and white.

Returning to FIG. 9, in certain embodiments, the number L of the first touch electrode signal line 14 electrically connected to the same first touch control electrode 11 may be configured to be smaller than or equal to 2M. The first touch electrode signal line 14 may be disposed between any two adjacent sub-pixel columns in the same pixel sequence. Thus, the resistance of the first touch control electrode 11 in the four primary color display panel may be reduced and, meanwhile, the total coupling capacitance formed between each first touch electrode signal line 14 and each data line 13 may be controlled within a desired range. Accordingly, a desired image performance and a desired touch control sensitivity of the four primary color display panel may be obtained.

Returning to FIG. 1, the display panel shown in FIG. 1 may be operated in a display stage and a touch control stage, for example, through a time-division driving method. In the display stage, the first touch control electrodes 11 may be multiplexed as a common electrode, which may be provided with a common signal or a ground signal. In the display stage, the plurality of first touch control electrodes 11 may be provided with a same common signal.

In the touch control stage, in one embodiment, the first touch control electrodes 11 may be touch control driving electrodes, in which pulsed touch control driving signals may be transmitted, while the second touch control electrodes 21 may be touch control sensing electrodes. Capacitance may be formed in intersection areas between the touch control driving electrodes and the touch control sensing electrodes.

When a touch occurs on the display panel, the capacitance formed between the touch control driving electrode and the touch control sensing electrode disposed close to the corresponding touch position may be changed. According to the capacitance change in the intersection areas between each touch control driving electrode and the touch control sensing electrodes, coordinates of the touch position may be calculated.

As shown in FIG. 1, the array substrate 10 may further include a first integrated circuit 15, which may be electrically connect to the first touch control electrodes 11 and the second touch control electrodes 21 through signal lines, respectively. The first integrated circuit 15 may be any appropriate display controlling circuits and/or touch scanning circuits and/or touch sensing circuits of the display panel.

In the touch control stage, the first integrated circuit 15 may provide the touch scanning signal to the touch control driving electrode 11 through the signal lines interconnecting the first integrated circuit 15 and the first touch control driving electrode 11. Meanwhile, the first integrated circuit 15 may receive the touch control sensing signal from the touch control sensing electrodes 21 through the signal lines interconnecting the first integrated circuit 15 and the second touch control driving electrode 21. In the display stage, the first integrated circuit 15 may provide the common voltage signal to each touch control driving electrode 11 through the signal lines interconnecting the first integrated circuit 15 and the first touch control driving electrode 11.

Figure 10:
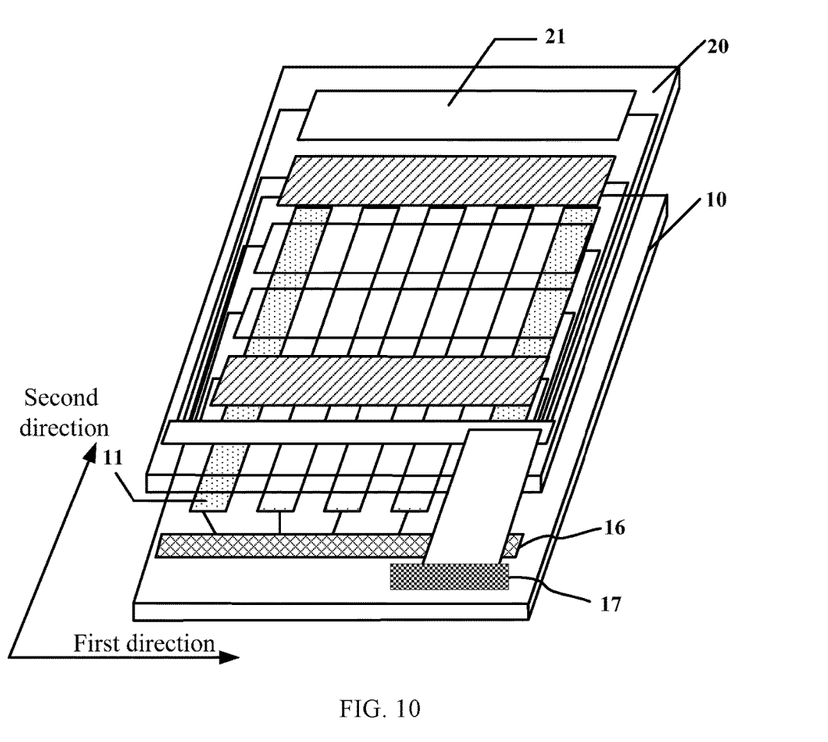
FIG. 10 illustrates another exemplary display panel consistent with disclosed embodiments.

FIG. 10 illustrates another exemplary display panel consistent with disclosed embodiments. Similar to the display panel in FIG. 1, the display panel in FIG. 10 may also include an array substrate 10 and a color film substrate 20. However, the display panel in FIG. 10 may include a second integrated circuit 16 and a third integrated circuit 17. The second integrated circuit 16 and the third integrated circuit 17 may be any appropriate display controlling circuits and/or touch scanning circuits and/or touch sensing circuits of the display panel, respectively.

The second integrated circuit 16 may be electrically connected to the first touch control electrodes 11 through a signal line, and the third integrated circuit 17 may be electrically connected to the second touch control electrodes 21 through a signal line. In the touch control stage, the second integrated circuit 16 may provide the touch scanning signal to the touch control driving electrode 11 through the signal lines interconnecting the second integrated circuit 16 and the first touch control driving electrode 11. The third integrated circuit 17 may receive the touch control sensing signal from the touch control sensing electrodes 21 through the signal lines interconnecting the third integrated circuit 17 and the second touch control driving electrode 21. In the display stage, the second integrated circuit 16 may provide the same common voltage signal to each touch control driving electrode 11 through the signal lines interconnecting the second integrated circuit 16 and the first touch control driving electrode 11.

Further, in certain embodiments, when the disclosed display panel is an OLED display panel, the color film substrate may be an encapsulation glass substrate, and the second touch control electrodes may be disposed on the encapsulation glass substrate.

Figure 11:
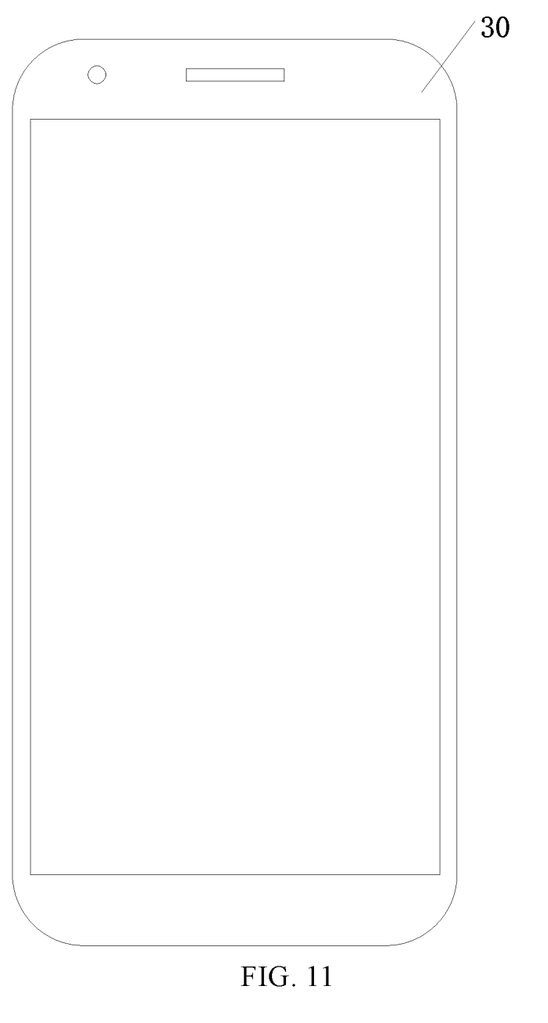
FIG. 11 illustrates an exemplary display device consistent with disclosed embodiments.

FIG. 11 illustrates an exemplary display device consistent with disclosed embodiments. As shown in FIG. 11, the display device 30 may be a smart phone, and the display device 30 may comprise any of the disclosed display panels. In addition to the disclosed display panel, the display device may also include any appropriate components, such as a backlight unit providing a backlight source to the display panel, which are not further explained here. It should be noted that, the disclosed display device is not limited to the smart phone shown in FIG. 11, and the disclosed display device may be a tablet, a TV, and a smart wearable device, etc.

Further, the accompanying drawings show that the first direction may be a horizontal direction, and the second direction may be a vertical direction. The first direction may be perpendicular to the second direction. The first direction and the second direction in the accompanying drawings are for illustrative purposes and are not intended to limit the scope of the present disclosure. In certain embodiments, the first direction may be not perpendicular to the second direction.

Further, as shown in FIG. 1, the first touch control electrodes 11 may be disposed on the array substrate 10, and the second touch control electrodes 21 may be disposed on one surface of the color film substrate 20 far away from the array substrate 10, which are for illustrative purposes and are not intended to limit the scope of the present disclosure. In another embodiment, both the first touch control electrodes 11 and the second touch control electrodes 21 may be disposed on the array substrate 10. In another embodiment, both the first touch control electrodes 11 and the second touch control electrodes 21 may be disposed on the color film substrate 20, or any other appropriate substrate.

In the disclosed embodiments, the number L of the first touch control electrode signal lines electrically connected to a same first touch control electrode may be configured to satisfy $L \leq M \times (N-2)$. M is a positive integer, and M indicates the number of the pixel sequences whose orthogonal projections onto the array substrate are covered by the orthogonal projection of the first touch control electrode onto the array substrate. N is a positive integer equal to or greater than 3, and N indicates the number of the sub-pixels continuously arranged in the first direction in each pixel.

The disclosed embodiments may not only reduce the resistance of the first touch control electrodes, but also control the coupling capacitance between the first touch control electrode signal lines and the data lines. Thus, the image performance of the display panel and the touch control sensitivity may be improved at the same time.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
an array substrate including a plurality of pixel sequences arranged in a first direction, wherein a pixel sequence includes a plurality of pixels arranged in a second direction intersecting the first direction, and a pixel includes N number of sub-pixels continuously arranged in the first direction, N being a positive integer equal to or greater than 3;
a plurality of first touch control electrodes arranged in the first direction, wherein an orthogonal projection of a first touch control electrode onto the array substrate covers an orthogonal projection of M number of pixel sequences onto the array substrate, M being a positive integer; and
a plurality of first touch control electrode signal lines, wherein a first touch control electrode signal line is electrically connected to a first touch control electrode to provide a signal to the first touch control electrode, L number of first touch control electrode signal lines are electrically connected to a same first touch control electrode, and L satisfies $L \leq M \times (N-2)$.

2. The display panel according to claim 1, wherein:
each first touch control electrode is electrically connected with a same number of first touch control electrode signal lines; and
the number L of the first touch electrode signal lines electrically connected to the same first touch control electrode stratifies $15 \times (N-2) \leq L \leq 35 \times (N-2)$.

3. The display panel according to claim 2, wherein:
a total number K of first touch electrode signal lines are disposed on the array substrate, wherein $540 \leq K \leq 1200$.

4. The display panel according to claim 1, wherein the array substrate further includes:
a base substrate;
a first metal layer disposed on the base substrate;
a second metal layer;
a third metal layer;
a first insulating layer disposed between the first metal layer and the second metal layer; and
a second insulating layer disposed between the second metal layer and the third metal layer,
wherein the first metal layer includes a plurality of scanning lines, the second metal layer includes a plurality of data lines, and the scanning lines intersect the data lines and are electrically insulated from the data lines.

5. The display panel according to claim 4, wherein:
the first touch electrode signal line is parallel to the data lines; and
the first touch electrode signal line is disposed between two adjacent sub-pixel columns.

6. The display panel according to claim 5, wherein:
two adjacent first touch electrode signal lines are provided with a same interval.

7. The display panel according to claim 1, wherein:
the first touch electrode signal line has a line width of approximately 2 μm-4 μm.

8. The display panel according to claim 4, further including:
a color film substrate arranged opposite to the array substrate,
wherein a plurality of color filter units and a black matrix separating the color filter units from each other are disposed on a surface of the color film substrate facing the array substrate.

9. The display panel according to claim 8, wherein:
the scanning lines intersect the data lines to form the sub-pixels;
wherein an extending direction of the scanning lines is parallel to the first direction;
the pixel includes three sub-pixels continuously arranged in the extending direction of the scanning line;
the color filter units corresponding to the three sub-pixels in a same pixel have different colors; and
the number of the first touch electrode signal lines electrically connected to the same first touch control electrode is smaller than or equal to M.

10. The display panel according to claim 8, wherein:
the scanning lines intersect the data lines to form the sub-pixels;
wherein an extending direction of the scanning lines is parallel to the first direction;
the pixel includes four sub-pixels continuously arranged in the extending direction of the scanning lines;
the color filter units corresponding to the four sub-pixels in a same pixel have different colors; and
the number of the first touch electrode signal lines electrically connected to a same first touch control electrode is smaller than or equal to 2M.

11. The display panel according to claim 8, wherein:
the first touch control electrode signal line is a fold line; and
the black matrix covers an orthogonal projection of the first touch control electrode signal line onto the color film substrate.

12. The display panel according to claim 8, wherein:
a plurality of second touch control electrodes are disposed on a surface of the color film substrate far away from the array substrate; and
an orthogonal projection of a second touch control electrode onto the array substrate is at least partially overlapped with each first touch control electrode.

13. The display panel according to claim 12, wherein:
the first touch control electrode is a touch control driving electrode, and the second touch control electrode is a touch control sensing electrode; and
the first touch control electrode is multiplexed as a common electrode in a display stage.

14. The display panel according to claim 12, wherein the array substrate further includes:
a first integrated circuit controlling the display panel;
wherein in a touch control stage, the first integrated circuit provides a touch control scanning signal to the first touch control electrode through the first touch control electrode signal line, and receives a touch control sensing signal sent by the second touch control electrode; and
in a display stage, the first integrated circuit provides a common voltage signal to the first touch control electrode through the first touch control electrode signal line.

15. The display panel according to claim 12, wherein the array substrate further includes:
a second integrated circuit and a third integrated circuit respectively controlling the display panel,
wherein the second integrated circuit is configured to:

in a touch control stage, provide a touch control scanning signal to the first touch control electrode through the first touch control electrode signal line; and in a display stage, provide a common voltage signal to the first touch control electrode through the first touch control electrode signal line, and the third integrated circuit is configured to:

in the touch control stage, receive a touch control sensing signal sent by the second touch control electrode.

16. A display device comprising a display panel, wherein the display panel comprises:

an array substrate including a plurality of pixel sequences arranged in a first direction, wherein a pixel sequence includes a plurality of pixels arranged in a second direction intersecting the first direction, and a pixel includes N number of sub-pixels continuously arranged in the first direction;

a plurality of first touch control electrodes arranged in the first direction, wherein an orthogonal projection of a first touch control electrode onto the array substrate covers an orthogonal projection of M number of pixel sequences onto the array substrate; and a plurality of first touch control electrode signal lines, wherein a first touch control electrode signal line is electrically connected to a first touch control electrode to provide a signal to the first touch control electrode, L number of first touch control electrode signal lines are electrically connected to a same first touch control electrode, and L satisfies L≤M×(N−2), where M is a positive integer, and N is a positive integer equal to or greater than 3.

17. The display device according to claim 16, wherein:

each first touch control electrode is electrically connected with a same number of first touch control electrode signal lines; and the number L of the first touch electrode signal lines electrically connected to the same first touch control electrode stratifies 15×(N−2)≤L≤35×(N−2).

18. The display device according to claim 17, wherein:

the display panel includes a total number K of first touch electrode signal lines, wherein 540≤K≤1200.

19. The display device according to claim 16, wherein the array substrate further includes:

a base substrate;

a first metal layer disposed on the base substrate;

a second metal layer;

a third metal layer;

a first insulating layer disposed between the first metal layer and the second metal layer; and a second insulating layer disposed between the second metal layer and the third metal layer, wherein the first metal layer includes a plurality of scanning lines, the second metal layer includes a plurality of data lines, and the scanning lines intersect the data lines and are electrically insulated from the data lines.

20. The display device according to claim 19, wherein:

the first touch electrode signal line is parallel to the data lines; and the first touch electrode signal line is disposed between two adjacent sub-pixel columns.

* * * * *